United States Patent [19]

Mikada et al.

[11] 4,099,247
[45] Jul. 4, 1978

[54] ELECTRONIC INSTRUMENT WITH NON-VOLATILE DISPLAY

[75] Inventors: Hiroyuki Mikada, Kawasaki; Sakae Houryu, Chigasaki; Jyuji Kishimoto, Tokyo, all of Japan

[73] Assignee: Canon Kabushiki Kaisha, Tokyo, Japan

[21] Appl. No.: 724,016

[22] Filed: Sep. 16, 1976

Related U.S. Application Data

[63] Continuation of Ser. No. 545,702, Jan. 30, 1975, abandoned.

[30] Foreign Application Priority Data

| Feb. 4, 1974 [JP] | Japan | 49-14361 |
| Feb. 8, 1974 [JP] | Japan | 49-15967 |
| Jan. 21, 1975 [JP] | Japan | 50-9177 |

[51] Int. Cl.² .................................................. G06F 3/14
[52] U.S. Cl. ................................ 364/710; 340/325; 364/900; 365/153
[58] Field of Search ................................ 235/156, 152; 340/172.5, 173 CH, 325, 336; 350/160 R; 58/23 R; 364/710, 200, 900; 365/153

[56] References Cited

U.S. PATENT DOCUMENTS

| 3,518,629 | 6/1970 | Frankel | 340/172.5 |
| 3,564,503 | 2/1971 | Kikuokubo et al. | 340/172.5 |
| 3,582,937 | 6/1971 | Dozer et al. | 340/325 |
| 3,732,545 | 5/1973 | Hatano | 340/172.5 |
| 3,736,569 | 5/1973 | Bouricivs et al. | 340/172.5 |
| 3,811,090 | 5/1974 | Uchida et al. | 340/173 CH |
| 3,812,489 | 5/1974 | Hiranu et al. | 340/336 X |
| 3,839,857 | 10/1974 | Berets et al. | 350/160 R X |

*Primary Examiner*—David H. Malzahn
*Attorney, Agent, or Firm*—Fitzpatrick, Cella, Harper & Scinto

[57] ABSTRACT

An electronic instrument with a non-volatile display comprises a drive control circuit for controlling the display, first and second clear means for respectively clearing the non-volatile display and the drive control circuit, and a single clear instruction generating circuit for generating a signal to actuate both first and second clear means. Thus the non-volatile display and the control circuit may be cleared simultaneously.

20 Claims, 18 Drawing Figures

FIG. 5A
OUTPUT OF FLIPFLOP 25
OUTPUT OF DELAY CIRCUIT 29
OUTPUT OF AND GATE 43
OUTPUT OF INVERTER 65
OUTPUT OF FLIPFLOP 27
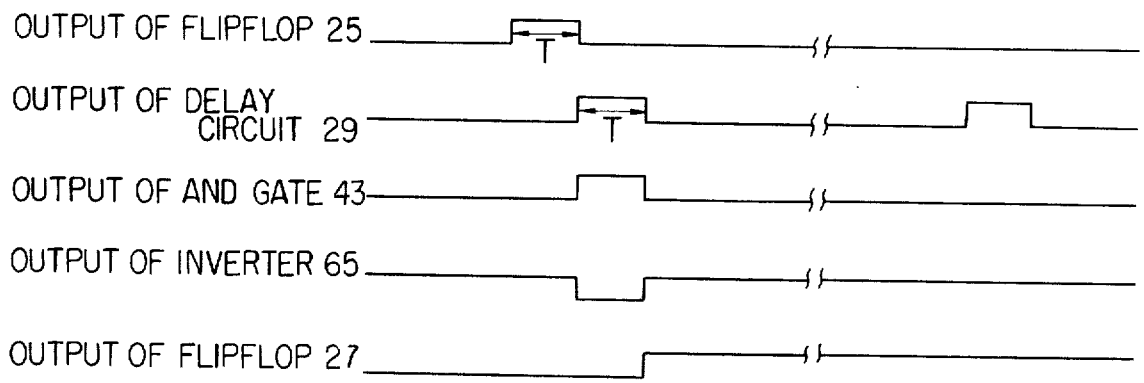
FIG. 6
TD 1
TD 2
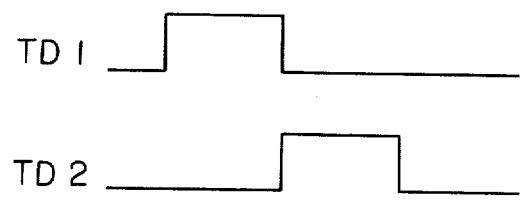
TD 3
FIG. 7
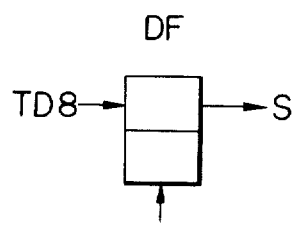
FIG. 8
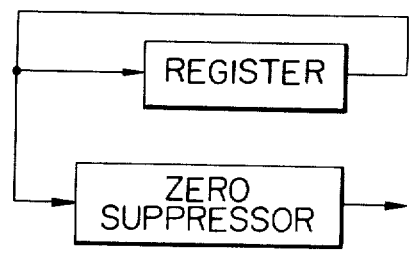
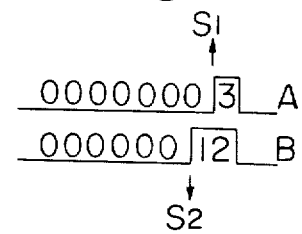
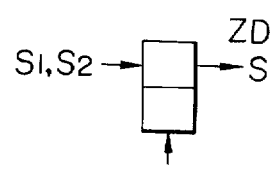
FIG. 9

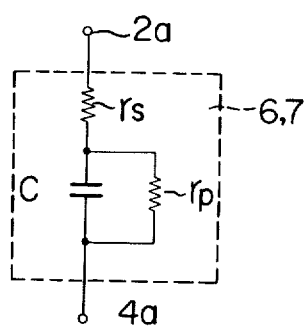
FIG. 10
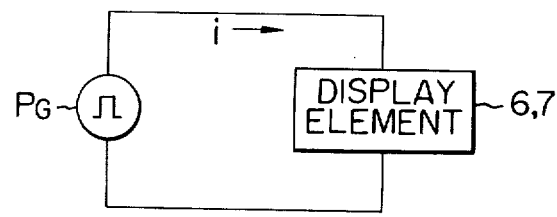
FIG. 11
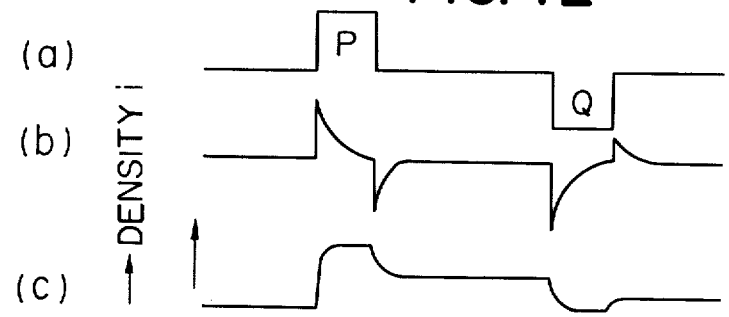
FIG. 12
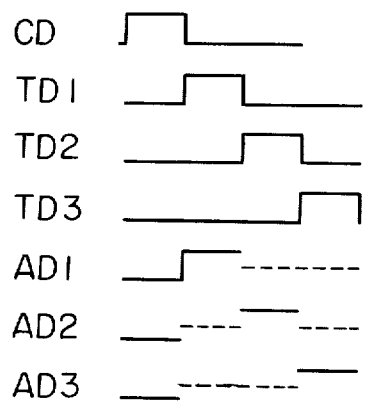
FIG. 14
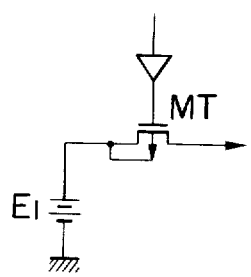
FIG. 16

ELECTRONIC INSTRUMENT WITH NON-VOLATILE DISPLAY

This is a continuation of application Ser. No. 545,702, filed Jan. 30, 1975, now abandoned.

BACKGROUND OF THE INVENTION

1. Field of the Invention

This invention relates to an electronic instrument having a non-volatile display, and more particularly to an electronic instrument in which appropriate ON-OFF switching of the power source for driving the non-volatile display and appropriate clearing of the display can be effected.

2. Description of the Prior Art

Non-volatile (or persistent) display means, or display means having a memory capability once display information has been written therein, can maintain contrast without volatilizing (or disappearing) even if the power supply thereto is cut off. This leads to various advantages such as reduced power consumption, positive information output, reusable soft copy, etc., and applications of such display means have therefore been studied extensively in recent years. Non-volatile display means are particularly well suited for use in computer output devices, camera viewfinders, viewers for microfilm readers (reader-printers), soft facsimile paper, etc., or editting drums in copying machines or the like.

However, incorporation of non-volatile display means into electronic instruments poses various problems. For example, a solution must be reached as to what specific measure is to be used to effect ON-OFF action of the driving power source for the volatile display means, and what timing and what specific measure is to be adopted to clear the display means. Further, consideration must be given to the correlations of semiconductor control circuitry for effecting the drive control of the non-volatile display means with the clearing action, viz. optimum selection and combination of the power source ON-OFF switching of the clear signal generating system, the control circuit and the non-volatile display means. Moreover, these considerations must be taken in conjunction with an optimum design whereby the electronic instrument is manually operated in actual use, so that greater ease of manipulation may be provided. For example, after an electronic instrument with non-volatile display means has been used, and when the power switch thereof has been opened, the image information previously displayed by the display means can be kept unchanged. But when the electronic instrument is again used, the previous image information is no longer necessary and a clearing action must, then be effected on the display means.

Also, even during use of the instrument, if the content of the display image has to be changed, no new image information can be written in until a clear signal is specially applied to the display means. Particularly, in portable electronic calculators or the like, operated numbers, operating numbers, results, etc. are all displayed by a single, plural-digit numerical display device. Thus, if it is desired to employ non-volatile display means therefor, successive clearing actions would be required and the provision of a special clear key for clearing the non-volatile display means would make the manipulation cumbersome. In the case of battery-driven portable calculators, battery power saving must be taken into account, and this could be expedited by the use of non-volatile display means. However, in order to satisfy such requirements overall considerations must be given to the battery ON-OFF timing and its operation with the non-volatile display means, the clear timing and its connection with the non-volatile display means, and even the clear timing and its connection with the semiconductor control circuit governing the drive control of said display means and arithmetic operations, as well as the ON-OFF timing of the battery as the power source for all of these circuits.

SUMMARY OF THE INVENTION

It is therefore a primary object of the present invention to provide a novel electronic instrument with a non-volatile display which encompasses the above-noted considerations.

It is another object of the present invention to provide an electronic instrument with a non-volatile display in which effective clear timing and its operation with the non-volatile display are provided.

It is still another object of the present invention to provide an electronic instrument with a non-volatile display in which effective clear control of the display may be effected in response to actuation of a power switch.

It is a further object of the present invention to provide an electronic instrument with a non-volatile display in which effective clear control of the display and its drive control circuit may be automatically effected in response to actuation of a power switch.

It is a further object of the present invention to provide an electronic instrument with a non-volatile display in which effective power source ON-OFF control of the display may be automatically effected.

It is a further object of the present invention to provide an electronic instrument with a non-volatile display which is excellent in operability and can ensure great savings in power consumption.

It is a further object of the present invention to provide an electronic instrument with a non-volatile display which can ensure a very high clear speed of the display.

It is a further object of the present invention to provide an electronic instrument with a non-volatile display which has a function of preventing reduction in writing density of the display.

Other objects, advantages and features of the present invention will become fully apparent from the following detailed description thereof taken in conjunction with the accompanying drawings, throughout which similar reference characters designate similar parts.

BRIEF DESCRIPTION OF THE DRAWINGS

FIG. 6 shows examples of the pulse generated by a digit pulse generator 71.

FIG. 7 shows a form of the circuit for detecting the rear edge BE of pulse TD8 in FIG. 6.

FIG. 8 illustrates the manner in which the output of a zero suppress circuit is detected.

FIGS. 9-I and 9-II show examples of the display provided by a numerical display device DSP.

FIG. 10 shows an example of the equivalent circuit of the non-volatile display.

FIG. 11 shows an empirical example of that circuit.

FIG. 12 shows examples of the waveforms observed in the circuit of FIG. 11.

FIG. 14 is a timing chart illustrating the operation of the embodiment shown in FIG. 13.

FIG. 16 shows another form of transistor Tr in FIG. 5.

DESCRIPTION OF THE PREFERRED EMBODIMENTS

Figure 1:
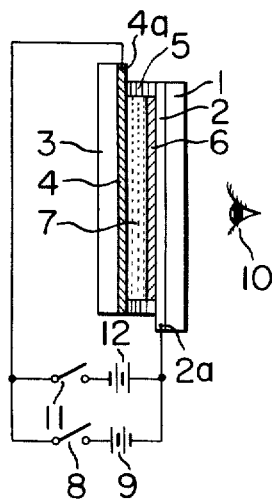
FIG. 1 is a cross-sectional view of an embodiment of the non-volatile display used with the present invention.

A suitable example of the non-volatile display material usable with the present invention is electrochromic material. Electrochromic material is a general term for materials which exhibit color in response to a supply of electric power thereto and may be reversibly decolored by the supply of electric power of opposite polarity, or by heating, or by a combination thereof.

The mechanism of creating electrochromy is not always singular but in most cases it is regarded as a so-called oxidation-reduction reaction of electrolyte with coloring material. In such cases, the electrolyte and the coloring material are not always distinguished from each other as the material. One material may sometimes be a coloring material and an electrolyte at the same time. From another point of view, electrochromy has been regarded as a variation in light absorbing characteristic caused by the introduction of electrons into the color center, as in the case of photochromy. Actually, it is understood that the electrochromy phenomenon takes place as the result of a combination of these.

The electrochromy process electrically varies the colors originally possessed by a material, and the combination of the colors is of great diversity. Whether the material can, reflect or scatter light is not determined by the property of the material itself but rather by the manner in which the electrochromy layer is constructed, and therefore, where it is to be used as display element it may be constructed as either a transmitting type or a reflecting type.

Because of the diverse constructions and color combinations, as well as the memory capability, which enables the coloring to be durable from the creation thereof until decoloring without supply of electric power, and the presence of materials in which colors are variable in accordance with the value of the voltage applied, various applications of electrochromy have been brought to mind and studied in recent years.

Typical display cell constructions are as follows:

(1) A construction in which an electrochromy (hereinafter abbreviated as EC) layer is disposed between a planar electrode and a needle electrode and supplied with electric power;

(2) A construction in which an EC layer is disposed between two planar electrodes and supplied with electric power and at least one of the electrodes may be in the form of a suitably patterned electrode (the example shown in FIG. 4); and (3) A construction in which an EC layer is disposed between two planar electrodes but a layer capable of changing from an electrically non-conductive state to a conductive state by an extraneous signal (for example, a photoconductive layer) is provided between the EC layer and at least one of said electrodes, and the conductive state may desirably be realized in a pattern. Typical applications include use as numeral or character display elements in desk top type electronic calculators, clocks, etc., use as display elements for displaying ordinary images, for example, in notice-boards, weather map display boards, road sign display boards, X-ray image display boards, etc., light shutters, soft facsimile display members erasable for reuse as facsimile signal recording, writing boards on which writing and erasing can be done in the same manner as blackboards, and so on.

Materials used for EC exist over a wide range from organic to inorganic materials. These are all usable with the present invention. In most cases, EC material comprises a combination of coloring material and electrolyte, but EC materials consisting of a single material are also known.

These known materials are disclosed in, for example, British Pat. No. 1,186,541, U.S. Pat. No. 3,712,710 and U.S. Pat. No. 3,578,843.

Any of various methods of forming a thin or a thick film may be applied as the method of forming an EC layer, especially a coloring layer. Typical methods are vacuum evaporation, sputtering, CVD (acronym for chemical vapor deposition which is a method whereby a chemical substance is cracked or reacted to effect vapor phase growth), spraying, coating, printing such as screen printing, etc. Vacuum evaporation and sputtering are suited to the formation of thin film of the transmitting type, and CVD can be utilized to form a wide range of layers from thin to thick film. For the formation of a layer of the transmitting type, the thickness of the layer is usually selected within the range of from several microns to several hundred angstroms, preferably from several microns to 1000 angstroms. For a layer of the scattering or reflecting type, the thickness is selected within the range of from several hundred microns to several thousand angstroms, preferably from 100 microns to 1 micron. Even with the same thickness, a layer of either the transmitting type or the reflecting type may be formed depending on the difference in manufacturing method and conditions.

EC provides a passive display which does not emit light but selectively absorbs ambient light to exhibit a constant. It has excellent display characteristics in that it does not fatigue the viewer's sight, it is not limited in the angle of its viewing field, and it can provide a display just as legible as printed material.

An example of the non-volatile display means used with the present invention is of such construction as shown in FIG. 1, which comprises a transparent glass plate 1, a transparent electrode 2 disposed on the glass plate 1 for displaying numerals, characters, symbols, figures or the like, another transparent glass plate 3 opposed to the glass plate 1, a metal electrode 4 disposed on the glass plate 3, an insulative spacer 5 interposed between the two glass plates, and an electrochromy layer 6 and electrolyte 7 disposed between the two electrodes.

Thus, for the display of numbers or the like, a switch 8 may be closed so that a voltage from power source 9 is applied between the two electrodes 4 and 2 to cause the electrochromy layer to provide coloration, thereby enabling an observer 10 to discriminate between the coloring portion and the non-coloring portion. For decoloring, a switch 11 may be operated so that a power source 12 opposite in polarity to the power source 9 is connected to effect drive of the opposite polarity.

The transparent electrode 2 may be formed of indium oxide ($In_2O_3$) or tin oxide ($SnO_2$), and the metal electrode 4 may be formed of gold (Au), silver (Ag), aluminum (Al) or the like. The electrochromy substance may be, for example, titanium oxide ($TiO_2$), tungsten oxide ($WO_3$), magnesium oxide (MgO), antimonium oxide ($Sb_2O_3$), silver oxide ($Ag_2O$), iridium sulfide (IrS), cobalt oxide ($Co_2O_3$), mercuric sulfide (HgS) or the like. The electrolyte may be, for example, $CaF_2$, $\beta$-$Al_2O_3$ or a $BaTiO_3$ or dispersion thereof in resin. Also, as other substances 6, 7 of memory capability, use may be made of an irregular ferroelectric substance such as $Gd_2(MoO_4)_3$ and its isomorph, or cholesteric liquid crystal comprising a capsuled mixture of cholesterilnonanate, choleresterilchloride and cholesterilcinnamate at a ratio of 70:25:5, or other non-volatile liquid crystal. A feature of the present invention is that it uses semiconductor circuit means of low power consumption (eg. CMOS—complementary metal oxide semiconductor—or the like) to control the display of such non-volatile display means and that the internal clearing action in said semiconductor circuit and the clearing action of said non-volatile display means are accomplished by a single clear instruction generating means.

Figure 2:
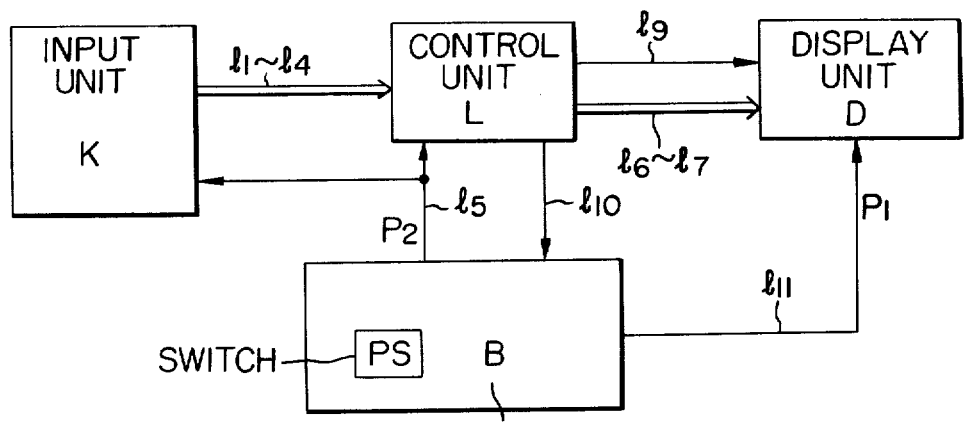
FIG. 2 is a block diagram of a basic embodiment of the present invention.

FIG. 2 shows a basic block diagram of an electronic instrument of the present invention using the non-volatile display means as shown in FIG. 1 or of the type (1), (2) or (3) mentioned above. In the figure, D designates a display unit including the above-described non-volatile display means, B designates a power supply unit, and PS designates a power supply ON-OFF control switch. L denotes a control unit for controlling the drive of the non-volatile display unit D and other data processings. The control unit L includes a semiconductor circuit portion, which may be either non-volatile (synonymous to "having a memory capability", that is, capable of keeping memory without being destroyed even if the power supply is cut off, as explained with respect to the non-volatile display means), or volatile. In the embodiments of the present invention, however, a volatile circuit is tentatively adopted and constructed with CMOS transistors. K is a manually operated unit for manually entering various instructions as inputs. The control unit L effects various data processings in accordance with the various input instructions from the unit K, so that observation of the display can be done through the display unit D. If the embodiment of FIG. 2 is specifically an electronic instrument such as a small electronic computer, microreader, copying apparatus or camera, then the unit K will include numeric and function keys, a search instruction key, a copy instruction key, a shutter button, and a film advance lever, etc. The unit L will include an arithmetic operation and display circuit, a film and an optical system and a drive control digital circuit therefor, a photosensitive drum and a drive control digital circuit therefor, and an exposure control digital circuit, etc. The unit D may include a non-volatile multi-digit numerical display device, a non-volatile film image projecting portion, a non-volatile editing drum, non-volatile display means in a viewfinder, etc. The unit B will provide a power supply ON-OFF control portion common with any of the electronic instruments. Also, the specific electrical connections shown in FIG. 2 are common with any of the above-mentioned or other electronic instruments. More specifically, various instructions from the manually operated unit K are applied as inputs to the control unit L through input lines $l_1 - l_4$. Line $l_5$ is a power supply line for supplying therethrough a source voltage P2 to the control unit L and the manually operated unit K. Lines $l_6$ and $l_7$ are for supplying image information to the non-volatile display unit D. Line $l_9$ is for delivering clear signals generated from the control unit L at various times to clear the non-volatile display unit. Line $l_{11}$ is a power supply line for supplying therethrough a source voltage P1 to the display unit D, and line $l_{10}$ is a control line for delivering an instruction for effecting ON-OFF action of the source voltage P1 on the line $l_{11}$ from the control unit L at various times.

Description will now be made of the operation of an electronic instrument in which the contents to be displayed are stored and preserved in the non-volatile display unit D even if the power switch PS is opened. A new operator does not need the information used and displayed by the previous operator. If the power switch PS is then closed, source voltage P2 will be supplied through power line $l_5$ to the operating unit K and the control unit L while source P1 will be supplied through line $l_{11}$ to the display unit D. The supply voltage P2 on line $l_5$ may cause the clear circuit in the control unit L to be operated for a predetermined time. Therefore, the clear circuit is operated to effect the clear of the registers, counters, etc. and the reset of the flip-flops, etc. in the semiconductor circuit, especially the digital circuit, in the control unit L. The technique so far described, that is, the so-called power clear mechanism (the mechanism of operating the clear and reset of the internal circuits upon closing of power switch PS), is well-known and commonly used, so it need not be described in detail. In the present invention, it should be emphasized that even the previous image information stored in the non-volatile display unit D may be cleared in association with the clearing action of the internal circuits in the control unit. More specifically, the supply voltage P2 on line $l_5$ operates the aforesaid clear circuit or other clear circuit in the control unit L and causes the display content of the non-volatile display unit D to be cleared through line $l_9$. Preferably, this clear signal is a clear pulse opposite in polarity to that used for writing, in the case of the previously described electrochromy substance or irregular ferroelectric substance, or in the case of a liquid crystal or the like, the clear pulse is a high-frequency pulse sufficient for erasure. In the case of a substance which can be cleared by heat or light, clearing may be effected through line $l_9$. In short, use may be made of any signal which can clear the non-volatile display substance and it will suffice to provide an optimum construction corresponding to the property of the substance.

In the conventional electronic computer using a volatile display substance (such as a light-emitting diode or the like), closing the power switch thereof results in the clearing and resetting of all of the display registers, counters, flip-flops, etc. Therefore, such a computer has been used in such an initial state that the display unit displays the content of the display register which has already been cleared, that is,

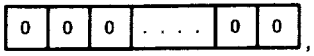

or a computer incorporating therein an unnecessary zero display suppress mechanism has been used with the display unit being all black

or partly turned on with "0" displayed only in one digit place, such as

This has resulted from the fact that only the content of the register has been cleared, and the computer is not provided with line $l_9$ or the like for applying a clear signal to the display unit itself. Thus, the words "clearing action" herein used in connection with the non-volatile display unit of the present invention are not intended to cover the above-described matters. Further, the line $l_9$ in the present invention is not necessary in the conventional electronic instruments using the volatile display units of the above-described type.

Now, as described above, the clear of the internal control circuit and non-volatile display unit can be effected at the same time simply by closing a single power switch PS, and this leads to the provision of a very preferable operability. Also, the fact that no exclusive clear key is required for the display unit obviously leads to a reduction in cost and size.

Figure 3:
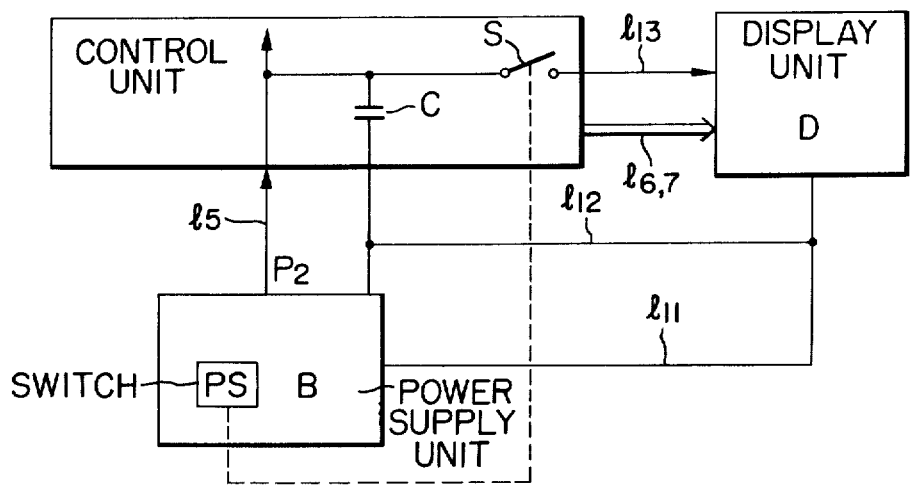
FIG. 3 shows another embodiment of the present invention.

FIG. 3 shows an arrangement in which opening of the power switch PS results in the clearing of the non-volatile display unit D. If, during the use of the electronic instrument, a capacitor C is charged with supply voltage P2 and switch S is closed in response to opening of the power switch PS, a closed circuit will be formed by lines $l_{12}$ and $l_{13}$ to permit the discharge current from capacitor C to flow into the non-volatile display unit D, so that clearing will be successfully accomplished if the polarity of the discharge current is made opposite to that during writing. In this case, if the semiconductor circuit in the control circuit L is volatile, it will store random numbers or assume unstable conditions. However, if the construction as shown in FIG. 2 is used, the semiconductor circuit will be cleared and reset for normal use when the power switch is closed. The other clear timings may of course be effected through a line similar to the line $l_9$ of FIG. 2. In FIG. 2, the control for suitably clearing or not clearing the non-volatile display unit D at other various times has been effected through line $l_9$, but the present invention can effect a further characteristic control, that is, ON-OFF control of the supply voltage P1 to the non-volatile display unit D by a suitable timing signal on the control line $l_{10}$. More specifically, as soon as the completion of display is automatically detected in the control unit L, a control signal may be caused to run on the line $l_{10}$ to nullify the supply voltage P1, or alternatively the supply of the voltage P1 may be stopped at optimum timing for the electronic instrument, as by an operation completion signal or immediately after the closing of the power switch PS.

Figure 4:
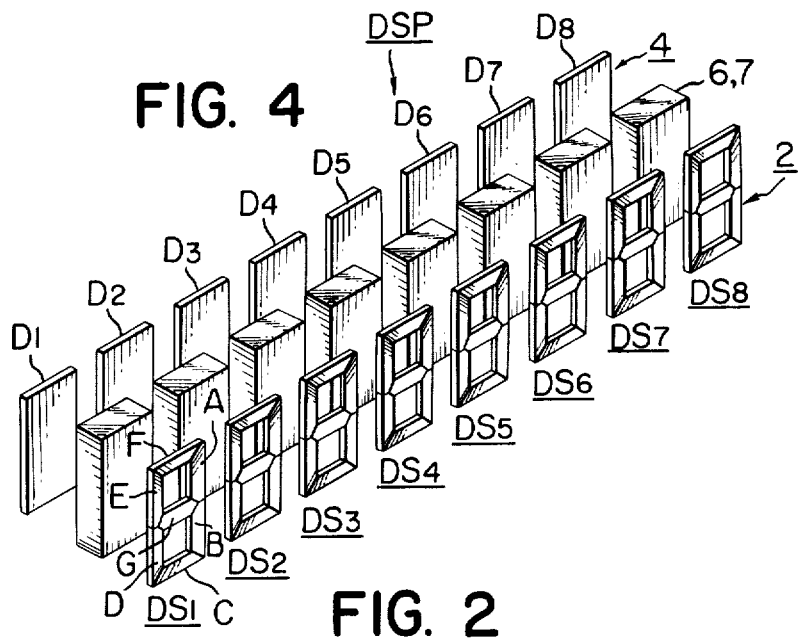
FIG. 4 is a perspective view showing an eight-digit numerical display device formed by the display of FIG. 1.

The electronic instrument of the present invention will now be described with respect to a pocketable electronic computer in which the control unit L substantially comprises CMOS or similar semiconductor circuits. FIG. 4 shows a numerical display device DSP comprising a plurality of basic cells shown in FIG. 1. Such non-volatile numerical display device DSP of FIG. 4 is fitted into the output display unit D of a miniature electronic computer. In FIGS. 5A and 5B, battery E1 in the power source unit B is for driving the non-volatile display unit D, battery E2 is for driving the keyboard K and the control circuit L, and PS is an interlocking power switch. The interlocking power switch is preferable in cases where greater safety and reliability are desired, whereas the switch PS need not be of the interlocking type but the battery E1 may remain connected to the emitter of transistor Tr. The transistor Tr governs the ON-OFF control of the supply voltage P1 to the display unit D. Control unit L includes therein SR type flip-flops 21-24, edge trigger type flip-flops 25-27 adapted to be set by a rising pulse, delay circuits 28-30 each providing a predetermined time delay, AND gates 31-43 and 91-99, OR gates 51-56, and inverters 61-68, the connections being as shown. Numeral 13 designates a conventional computer operation circuit, in which IR is an input or display register for storing therein number signals from numeric keys on the keyboard and for delivering such signals through line $l_7$ to the non-volatile display unit D. On the way to the display unit D, these signals are passed through a converter 73 including a decimal decoder, 7-segment character encoder, etc., and then amplified by a segment driver circuit 74. Reference numeral 71 denotes a digit pulse generator which may be triggered by a signal from the operation circuit 13 to generate successive digit pulses TD1-TD8. AND gates 91-98 are for controlling the digit pulses from the digit pulse generator 71 by a signal $\overline{CD}$. Reference numeral 72 designates a digit pulse driver circuit for amplifying the digit pulses passed through the AND gates 91-98, respectively, and for successively driving the digit electrodes D1-D8 in the display device DSP. The segment driver circuit 74 is commonly connected to the same respective segment of each digit. The described arrangement is substantially similar to a time division dynamic display system using a conventional volatile display device. However, this arrangement, which uses a non-volatile display substance, has the advantage that ordinary time division scanings (digit pulses TD1, TD2, ..., TD8 are successively generated, and when the register IR has made one round, total digit display occurs. Before the display disappears, a second scanning, i.e. second generation of digit pulses TD1-TD8 and second one round of the register occur) can be effected at one time. In the above-described arrangement, if it is desired to effect an operation which requires entry of inputs from the keyboard in the order of

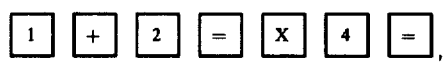

the set outpts F1-F4 of the flip-flops 21-24, ON-OFF actions of the supply voltages P1 and P2 (ON:1, OFF:1) and the operation of the display unit D will be such as shown in the table below. This example is of an embodiment wherein the displayed content (e.g. the result of a prior operation, "56") does not disappear even after the power switch is opened.

| Key op. | F1 | F2 | F3 | F4 | P1 | P2 | DISPLAY |
|---|---|---|---|---|---|---|---|
| PS off | | | | | 0 | 0 | 56 |
| ① PS on | 0 | 0 | 0 | 0 | 1 | 1 | clear |
|  | 1 | 0 | 0 | 0 | 0 | 1 |  |
| ② [1] | 0 | 0 | 0 | 1 | 1 | 1 | clear |
|  | 0 | 0 | 0 | 1 | 1 | 1 | 1 |
| ③ [+] | 0 | 0 | 1 | 0 | 1 | 1 | clear |
|  | 0 | 1 | 1 | 0 | 1 | 1 | 1 |
|  | 1 | 0 | 1 | 0 | 0 | 1 | 1 |
| ④ [2] | 0 | 0 | 0 | 1 | 1 | 1 | clear |
|  | 0 | 0 | 0 | 1 | 1 | 1 | 2 |
| [=] | 0 | 0 | 1 | 0 | 1 | 1 | clear |
| ⑤ | 0 | 1 | 1 | 0 | 1 | 1 | 3 |
|  | 1 | 0 | 1 | 0 | 0 | 1 | 3 |
| ⑥ [X] | 1 | 0 | 1 | 0 | 0 | 1 | 3 |
| ⑦ [4] | 0 | 0 | 0 | 1 | 1 | 1 | clear |
|  | 0 | 0 | 0 | 1 | 1 | 1 | 4 |
| [=] | 0 | 0 | 1 | 0 | 1 | 1 | clear |
| ⑧ | 0 | 1 | 1 | 0 | 1 | 1 | 12 |
|  | 1 | 0 | 1 | 0 | 0 | 1 | 12 |
| ⑨ PS off | | | | | 0 | 0 | 12 or clear |

On the basis of the table above, description will now be made of an example of the operation sequence, such as

[PS]on → [1] → [+] → [2] → [=] →

[X] → [4] → [=] → [PS]off.

1 The interlocking power switch PS of the power source operating unit B is closed at the ON-side terminal, whereupon the voltage P2 of the battery E2 is supplied to the volatile control circuit L and also to the clear circuit 14, which is thus operated to distribute "all clear" signal CO to the control circuit L, thereby resetting all flip-flops (hereinafter abbreviated as FF) 22-27. As a matter of course, this "all clear" signal CO is also applied to the operation circuit 13 to clear or reset most of the register IR and other registers, counters, FF, etc. This clear circuit 14 may be provided by a well-known circuit. Alternatively, a certain counter, FF, etc. may be preset. More specifically, FF 21 may once be set by "all clear" signal CO, and then reset with a suitable time delay. Also, as has been conventional, it can be easily achieved to cause coloring of a digit in the display device, such as DS1 or DS8, in lieu of power lamp, to thereby indicate that the power switch has been closed. The output F1 of FF 21 is applied to the base of transistor Tr through the amplifier circuit A and resistor r1 of the power source circuit B and the emitter of the transistor is connected to the higher potential side of the driving battery E1 for the display unit D and therefore, when F1=0, the transistor Tr is turned on to supply the voltage P1 to the display unit D. Also, FF 25, 26, 27 are of the edge trigger type which is set by a rising input pulse and thus, at the moment F1 assumes low level, the output of the inverter 61 assumes high level and FF 25 is set while, at the same time, FF 26 is also set by the set output of FF 25 passed through OR ate 56. The set output CD of FF 26 is applied to the digit pulse generator 71, digit pulse driver circuit 72 and segment driver circuit 74 of the display unit D to perform the function of clearing the display content so far stored in the display device DSP (for example, the result of the previous operation, "56"). The period during which CD=1, namely, the period during which the set output of FF 26 is at high level, is a sufficient time so that all the memory in the display device may be completely cleared, and such period is set by the delay circuit 29. The delay time T of the delay circuit 29 is determined to an optimum value by the property of the non-volatile display device DSP. When the delay time elapses, FF 26 is reset so that CD assumes low level (CD=0) and thus, the clear of the display device DSP is completed. In case where the display device DSP is constructed by the aforesaid electrochromy substance, irregular ferroelectric substance or the like, as a specific mans for performing the clearing action a signal opposite in polarity to that during writing is applied. For example, if a voltage (or current) of positive polarity and a voltage of negative polarity were applied to the digit electrodes D1–D8 and the segment electrodes A–G, respectively, during writing, a voltage of negative polarity and a voltage of positive polarity may be applied to the digit electrodes D1–D8 and the segment electrodes, A–G, respectively, during clear. Where non-volatile liquid crystal or the like is used for the display device, a high-frequency pulse or the like may be applied. Or alternatively, one of other various means such as heating, irradiation with light or the like may be used in accordance with the physical property of the display device DSP. Upon completion of the clearing action, the output of the delay circuit 29, as shown in FIG. 5C, is applied to the AND gate 43. Since, at this time, the output of the inverter 66 is a high-level signal, the AND gate 43 is opened to permit this signal to pass through the OR gate 55 and the AND gate 31 to set FF 21. Thus, the set output F1 thereof assumes high level to cut off the transistor Tr through amplifier A. On the other hand, the output of the AND gate 43 is applied to the edge trigger type FF 27 through the inverter 65 and FF 27 is set by the rising of the output signal of the delay circuit 29, namely, the rising of the output of the inverter 65, as shown in FIG. 5C, so that the output signal of FF 27 rises. This rising output signal is inverted to a low-level signal by the inverter 66 and closes the AND gate 43. Thus, the AND gate 43 does not open any longer and prevents the output signal thereafter produced by the delay circuit 29 from being applied to FF 21. This process ① assumes the same mode of operation even if an ordinary "all clear" key [C] is depressed, and thus the same effect can be expected. Also, when an ordinary entry clear key is depressed, an output signal may be provided from the OR gate 56, in addition to the clear of the display register IR, thus enabling the display device DSP to be cleared in the same manner as previously described.

② Next, numeric key [1] on the key board K is depressed to enter the operation data "1". A decimal number signal N for this is applied as input to the operation circuit 13 through input line $I_2$ and encoded therein, and then stored in the register IR. On the other hand, FF 21 was set at the foregoing stage ① and therefore, the AND gate 41 now provides an output signal which is being applied to one input terminal of the AND gate 36 through the OR gate 52, so that the depression of the numeric key ①opens that AND gate 36, the output of which thus sets FF 24. The number signal N on the input line $l_2$ is also applied to the AND gate 32 to reset FF 21. Thus, the set output F1 thereof again assumes low level and in the same manner as described, the transistor Tr is turned on to permit the supply voltage P1 to be again supplied to the display unit D, thus making preparations for a new display content to be written in. Also, by the reset of FF 21, FF 25 and 26 are set in the same manner as described with respect to the previous closing of the power switch PS, to produce a clear signal CD which again clears the display device DSP, whereas no change occurs to the display device DSP because it has already been cleared upon previous depression of the power switch PS. However, depending on the physical property of the display device DSP, a single clearing action may sometimes fail to clear the device positively, and in this connection, it would be effective for the purpose of providing a sharp contrast to effect two clearing actions on a display device having such physical property. Further, the above-described operation is indispensable during depression of the first operating number which will later by described, and it is effective to effect the same control by a few circuits as in the present embodiment. Subsequently, the operation circuit 13 confirms that numeral "1" has been stored in the register IR, and causes an operation instruction for digit pulse generator 71 to be produced on the output line $l_6$ and a signal for numeral "1" is applied from the output line $l_7$ to the converter 73 and decoded thereby into a decimal character and further encoded into a combination code of segments A–G, which is applied to the segment driver circuit 74. The segment driver circuit 74 outputs signals representing the numeral "1" (for example, signals $S_A$ and $S_B$ are produced on the output lines $l_a$ and $l_b$ for displaying the segments A and B), thus driving all segments A and B of each digit. When this occurs, a digit pulse TD1 for driving the first digit is produced by the digit pulse generator 71 and amplified by the digit pulse driver circuit 72, so that the numeral "1" is written in the first digit DS1 of the display device DSP. This writing technique is identical with that of the conventional dynamic display driving system, but each of the digit pulses TD1–TD8 can complete the writing by one output. The register IR can also output all numerical values and write them all in the display device DSP by one circulating action and so, the output of the register IR need no longer be directed to the display device DSP after that, but may be used for other purposes or may be cleared to permit other numerical content to be stored therein.

③At the stage ② whereat the numeral "1" stored in the register IR by depression of the numeric key ① is displayed in the first digit DS1 of the display device DSP, a function ley ⊞ is now depressed. Thereupon, a function signal F passes through the input line $l_1$ to set and reset FF 23 and 24, respectively. The function signal F also passes to the operation circut 13 to set its various circuit elements to the mode of adding operation, and further executes the addition of operated number "1" and numeral "0", and again stores the result "1" (sum) in the register IR. Such processing can readily be achieved by a conventional computer technique. When this operation is completed, an operation completion signal E is outputted from the output line $l_8$ to set FF 26. Thus, in the same manner as previously described, the clear signal CD is generated to clear the number "1" so far displayed in the first digit of the display device DSP. Also, when the set time of the delay circuit 29 terminates, the clearing action terminates as already described. The operation completion signal E is also applied to the delay circuit 28, from which it is outputted as a display completion signal S after the lapse of a maximum time required for the writing in the display device DSP to be terminated, and is applied to the set input terminal of FF 22 to set the time. During the starting time of this delay circuit 28, the numeral "1" stored in the register IR is again written in the first digit DS1 of the display device DSP in the same manner as previously described. The display completion signal S is also applied to the delay circuit 30, where it is delayed a predetermind time, whereafter it sets and resets FF 21 and FF 22, respectively. Now that FF 21 has been set, the transistor Tr is turned off in the same manner as previously described, to stop the supply of the voltage P1 to the display unit D. Thus, the battery E1 is not consumed till the entry of a subsequent operating number "2" and thus, the operator can amply afford to proceed with preparations such as choice of operating number and so on.

④Numeric key ② is depressed to store an operating number "2" in the register IR. The operated number "1" previously stored in the register IR is transferred to another register (not shown) in the operation circuit 13 at the stage of depression of the function key ⊞ or immediately after entry of the operating number "2". When the numeric key ② is depressed, FF 21 and 23 are reset while FF 24 is set. Through the same process as described in②, the display device DSP clears the number "1" so far displayed and thereafter, the number "2" is written in the digit DS1.

⑤When key ⊟ is depressed, the same process as in ③ occurs. That is, FF 23 and 24 are set and reset, respectively, and in the operation circuit 13, the adding operation 1+2=3 is processed and the number "3" is outputted and written in the display device DSP.

⑥To effect an operation in continuation of the previous operation result, key ⊠ may simply be depressed. FF 21 and 23 remain unchanged (F1=1, F3=1) and ready for a subsequent entry.

⑦Numeric key ④ is depressed. In the same process as ④ the conditions of the various portions are changed so that the number "4" is written and displayed in the display device.

⑧Key ⊟ is depressed, whereby the same process as ⑤ occurs so that the operation result "12" is written and displayed in the display device DSP.

⑨ The power switch PS is opened, whereuon the supply of the voltages P1 and P2 is cut off while the numeral "12" remains displayed on the display device DSP. Since the operation result holds as long as the display device DSP maintains its memory capability, the operation result can be read even after the voltage supply has been cut off. It will be recalled that, when the power switch is in OFF position, the display device DSP can be cleared by the use of the electric energy so far stored in the capacitor as shown in FIG. 3, and it will be apparent that such clear mechanism can be accomplished substantially in the same manner as described above with respect to the example of FIG. 5. Further, in FIG. 5, the display completion signal S is produced in the delay circuit 28 which is delayed a predetermined time in response to the operation completion signal E, but this is not restrictive. For example, even the rear edge of the last digit pulse TD8 of the digit pulse generator 71 signifies the completiion of display. More specifically, as shown in FIG. 6, the rear edge BE of the last digit pulse TD8 is the point of time at which the digit scanning of the 8-digit numerical display device DSP is completed and therefore, by applying the last digit pulse TD8 to the flip-flop DF which, as shown in FIG. 7, is adapted to be set by the falling of the pulse, the display completion signal S can still be produced and such signal S may be applied to FF 22 as in FIG. 5. Also, in case of a computer, it is rare that the numerical data to be displayed in all digits are stored in the display device DSP and the display register IR but it is rather often that "0" which need not be displayed is usually present in the most significant digits. In such cases, the display completion signal S can also be produced by utilizing the output signal of a conventional zero suppress circuit ZS as shown in FIG. 8, because such circuit is provided in computers. In other words, the output of the circuit ZS is such as indicated at A and B, and a flip-flop ZD for detecting these effective digit display completion signals S1 and S2 may be provided in the same manner as that shown in FIG. 7. In that case, easier construction will be ensured by resorting to the ordinary display method whereby numbers are shifted and displayed from right to left of the display device DSP as shown in FIG. 9-I. More specifically, by making such a design that the numerical data to be displayed in the order of less significant digits to more significant digits are derived from the register IR and that digit pulses are generated from the digit pulse generator 71 in the order of TD8, TD7, . . . , TD2, TD1, the signals S1 and S2 of FIG. 8 may provide the display completion signal S. If the construction is such that display occurs from left to right of the display device DSP as shown in FIG. 9-II, the same result may be obtained by making such a design that the numerical data are derived from the register IR in the order of more significant digits to less significant digits and that the zero suppress circuit ZS discerns unnecessary zeroes to be displayed in less significant digits. Realization of these could very readily be practised by those skilled in the art from the prior zero suppress technique and is intended to be covered within the technical scope of the present invention. Further, the above-described methods whereby the display completion signal S is produced upon completion of numerical display in the effective display digits to thereby cut off the supply of the voltage P1 to the display device DSP are more flexible than the previously described two methods, namely, the method using the delay circuit 28 and the method of detecting the digit pulse TD8, and in addition, are very superior in the speed-up of the entire operation and even in greater saving of the power of battery E1. Also, the method shown in FIG. 9-II wherein display occurs from the left end of the display device DSP is most suitable as the display method using a non-volatile display substance. The reason is that with the method shown in FIG. 9-I wherein the display progresses with numbers being shifted, the content written in a digit must be cleared before display in a subsequent digit progresses, whereas the method of FIG. 9-II eliminates the necessity of doing this and accordingly, the necessity for any special clear circuit, shift circuit, etc., which in turn leads to the advantage of a very simple circuit arrangement. The method of FIG. 9-II can also achieve, to a maximum extent, the power saving effect which is the greatest merit of non-volatile display substance.

Attention is now called to the electrical characteristic of a non-volatile display substance, especially, electrochromy substance. The electrochromy material 6 is an electrical resistor and its resistivity is about $10^8$ to about $10^{11}$ ($\omega$m), although it is widely variable depending on the type of material. The electrolyte 7 has a resistivity as high as $10^4$ times that of the electrochromy material 6, and its specific inductive capacity is 2 to several tens. As an example, if the cross-sectional area is $1 \times 10^{-2}$ (m$^2$) and the thickness of each of the materials 6 and 7 is about 5000 Å, the series resistance $r_s$ of the electrochromy material 6 is about $100\omega$ and the resistance $r_p$ of the electrolyte 7 is several meg$\omega$. The electrostatic capacity is $10^4$ to $10^5$ (PF). Thus, there is provided such an equivalent circuit as shown in FIG. 10. If a pulse having waveforms P and Q as shown in FIG. 12(a) is applied from a pulse generator PG of FIG. 11 to the opposite electrode terminals 2a and 4a in FIG. 10 and when the current $i$ is measured, then a waveform as shown in FIG. 12(b) will be observed on an oscillograph. In other words, when the input pulse P rises, a current abruptly flows to cause coloring of the display elements 6 and 7. However, falling of the pulse P causes the charges stored in the electrolyte to flow back and such backflow reduces the density of coloring, although it would not completely decolor the elements 6 and 7. This phenomenon is shown in FIG. 12(c). Or alternatively, if an erasing pulse Q is applied, decoloring will be caused by falling of the pulse Q, but during rising of the pulse Q the stored charges will be displaced to cause coloring again, though with a low density. This is not preferable because it may cause reduction in the display contrast of coloring and decoloring.

Figure 5:
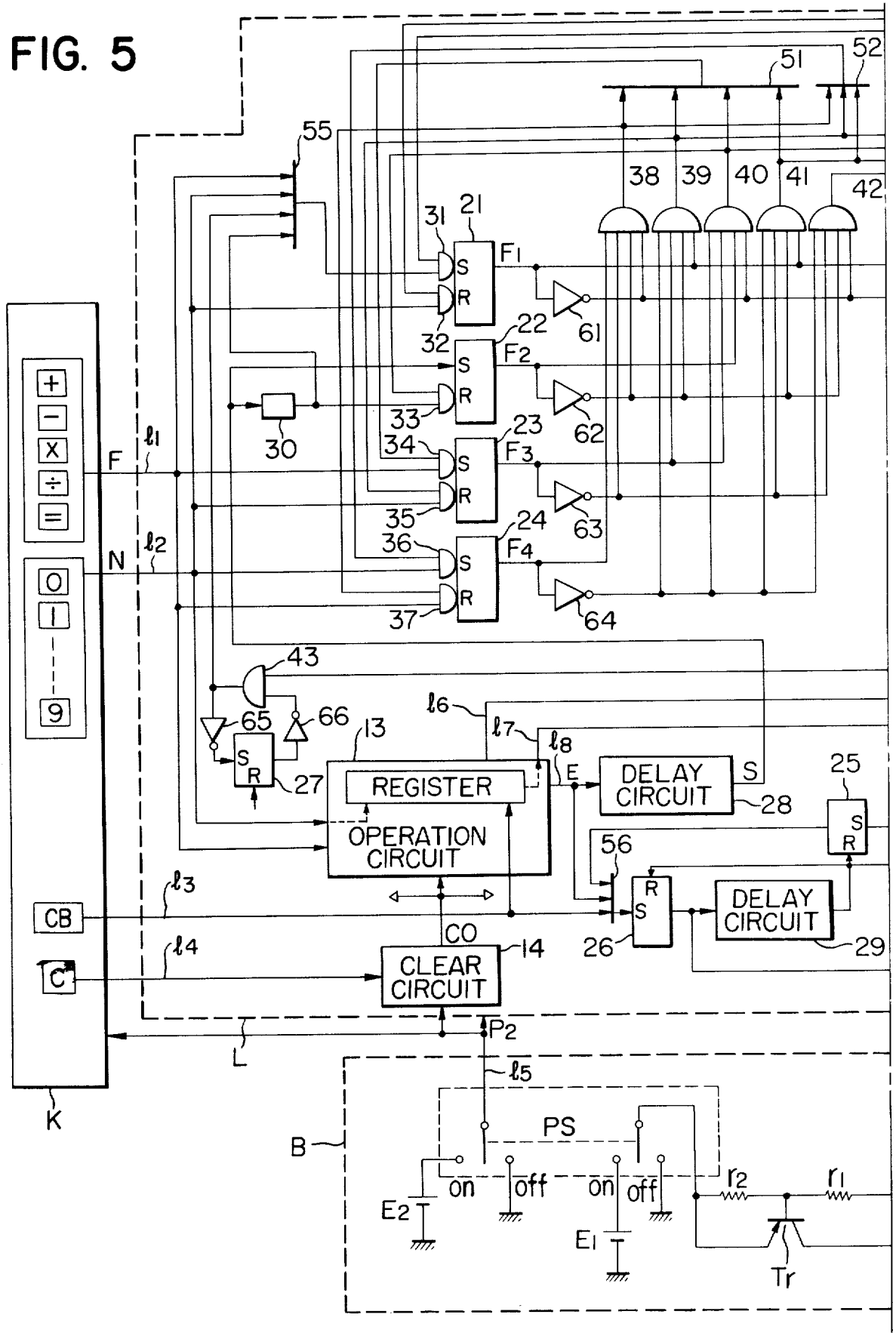
FIGS. 5A and 5B diagrammatically show an embodiment of the present invention in which the display device of FIG. 4 is used with a small electronic calculator.
FIG. 5C is a timing chart illustrating the operation when the power switch is closed.
Figure 5:
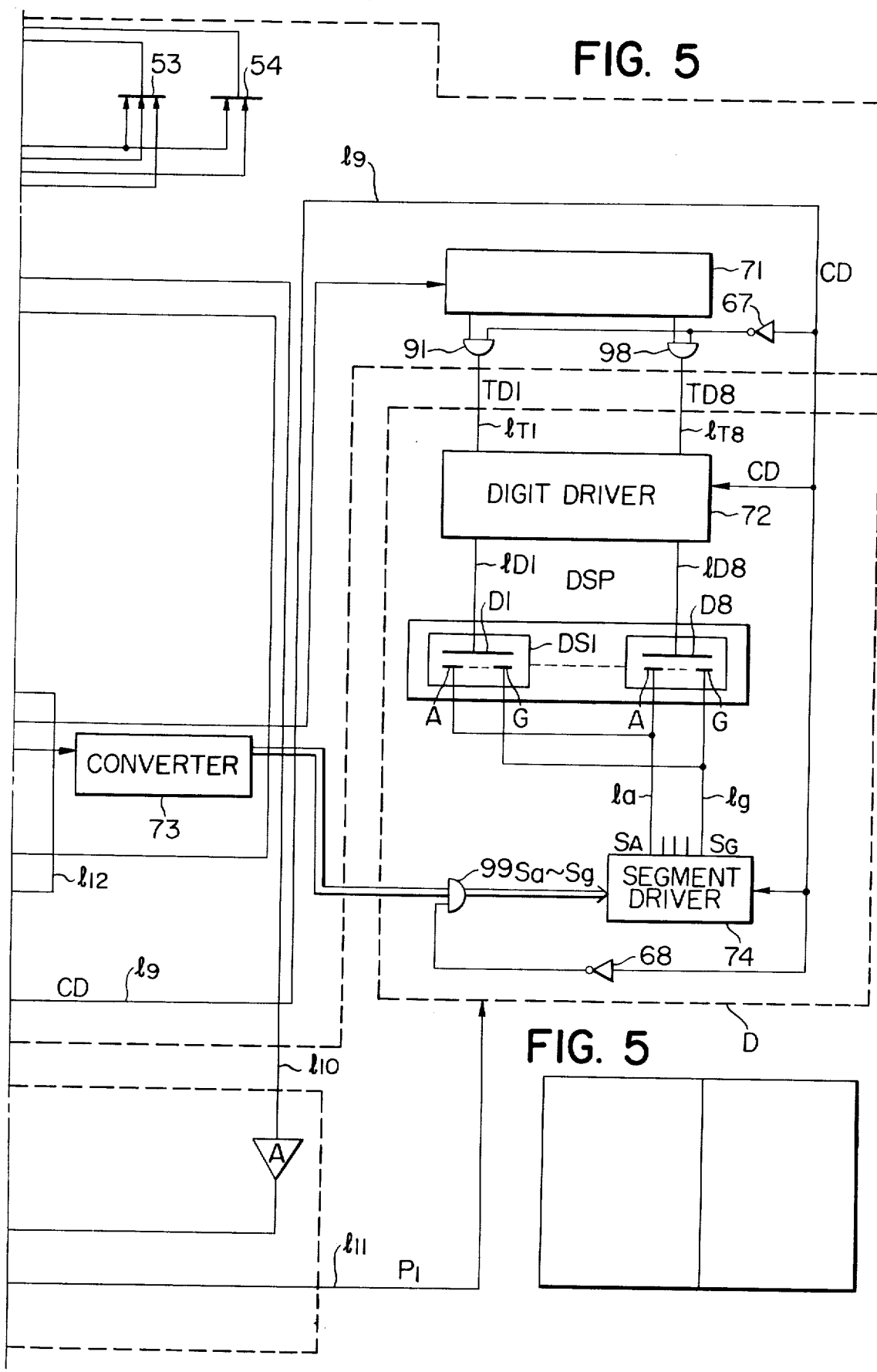
Figure 13:
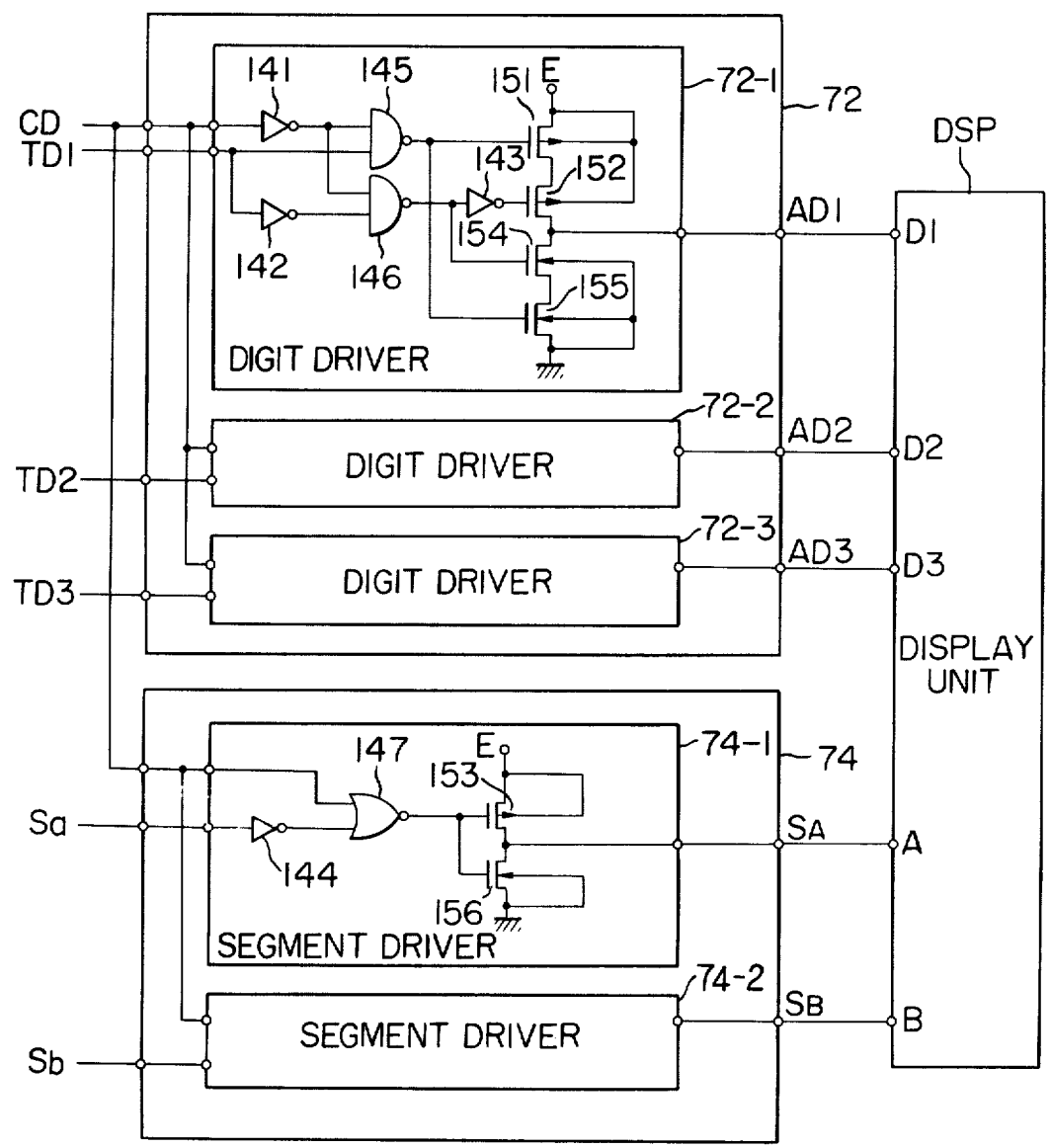
FIG. 13 diagrammatically shows a specific embodiment of the driver circuits 72, 74 shown in FIG. 5.

FIG. 13 shows a specific embodiment which overcomes the above-described difficulties, and also shows the driver circuits 72 and 74 of FIG. 5 in particular. In FIG. 13, the display device DSP of FIG. 4 is shown as a three-digit device and two segments A and B are shown representatively. Each of the digit drivers 72-1, 72-2 and 72-3 of the digit pulse driver circuit 72 has a circuit arrangement as indicated by 72-1. Likewise, each of the segment drivers 74-1 and 74-2 of the segment driver circuit 74 has a circuit arrangement as indicated by 74-1.

FIG. 14 is a timing chart for various portions of FIG. 13. A three-digit two-segment display device is herein supposed, and the timing chart shown refers to a case where all digits are erased when CD=1, whereafter the first digit displays both segments A and B, the second digit displays segment A alone and the third digit displays nothing.

Operation of the embodiment of FIG. 13 will now be described by reference to the timing chart of FIG. 14. When CD=1, the AND gates 91–98 in FIG. 5 are closed, all of the outputs TD1–TD8 assume low level, the output of inverter 141 is 0, the outputs of NAND gates 145 and 146 are 1, respectively, and the output of inverter 143 is 0, so that P-channel MOS transistors 151 and 152 are turned off and on, respectively, and N-channel transistors 154 and 155 are both turned on, whereby digit pulse output AD1 is connected to a reference potential source. Likewise, AD2 and AD3 are also connected to the reference potential source. When CD=1, operation of the segment driver circuit 74 is such that AND gate 99 in FIG. 5 is closed, outputs Sa–Sg all assume low level, output of NOR gate 147 in FIG. 13 is 0, P-channel transistor 153 is turned on and N-channel transistor 156 is turned off, so that segment output $S_A$ is likewise connected to E.

The present embodiment is designed to make such connection, that is, digit electrodes D1–D3 assume reference potential and segment electrodes A and B assume positive potential, whereby all displays are erased in unison. If digit pulse signals such as TD1–TD3 of FIG. 13 are applied to the digit driver circuit 72 immediately after CD=1 has terminated, AD1–AD3, when selected as shown in FIG. 14, will assume "1" and, when not selected, will assume floating conditions under which they are connected to none of the power sources, since transistors 152 and 154 are both turned off. On the other hand, segment drive signals such as $S_A$ and $S_B$ in FIG. 14 are outputted in response to segment signals Sa and Sb from the converter circuit 73, but since $S_A$ and $S_B$ both are at reference potential when digit pulse AD1=1, segments A and B of the first digit DS1 in the display device DSP will be coloring. From then on, the coloring may be continued due to the non-volatile property even if there is no writing pulse. When AD=2, $S_A$ alone assumes a reference potential so that only the segment A of the second digit DS2 will color and continue to be coloring. Neither segment of the third digit DS3 will color. Such design creates the following features: (1) All digits can be cleared in unison and this leads to speed-up of the clearing action, which in turn greatly contributes to speed-up of the entire process. In the present-day stage, electrochromy substance requires considerable time both for writing and erasing. Thus, about 0.1 second will be required to clear each digit and in case of an eight-digit display device DSP, the total time required for clearing will be 0.8 second, whereas the arrangement of FIG. 13 will enable all digits to be cleared simultaneously in only 0.1 second which corresponds to the clearing time for one digit. (2) Where the display substance has the characteristic that it is decolored by a flow of reverse current at the termination of a writing pulse, as previously explained with respect to the electrical characteristic of electrochromy substance, the transistors 152 and 154 are designed to be turned off simultaneously and thus, little or no reverse current is produced, which greatly contributes to enhancement of contrast. Such design is effective for any display substance which is provided with memory capability. It is applicable to, for example, the aforementioned irregular ferroelectric substances, liquid crystals, etc., with a result that contrast is greatly improved. Further, by making such arrangements that not only the digit electrodes D1–D3 but also the segment electrodes A and B assume floating conditions at the termination of the writing signal, outflow of the reverse current is more completely prevented.

Figure 15:
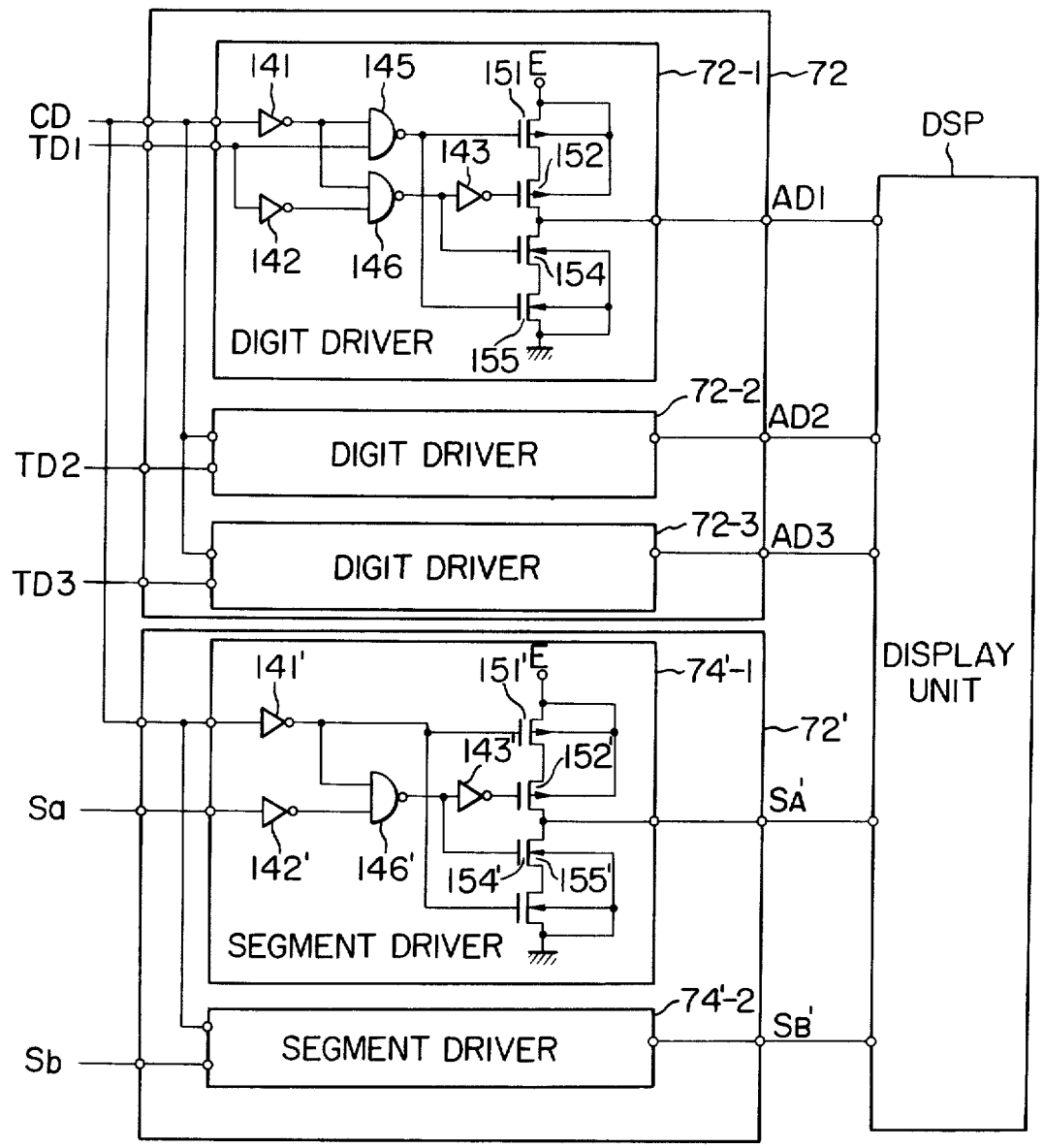
FIG. 15 shows another embodiment of the driver circuits.

An example of this is shown in FIG. 15, but the operation thereof is similar to that of FIG. 13 and need not be described. As another example of the prevention of outflow of the reverse current, use may be made of MOS transistor MT as shown in FIG. 16, in lieu of the ON-OFF control transistor Tr for voltage P1 shown in FIG. 5. MOS transistor has a very high insulation resistance and is suited for these purposes.

The present embodiment has been described with respect to the case where all the numerical data are of one digit, but it will be apparent that the same effect may result even if the numerical data are of plural digits. In case of plural digits, it will also be possible to readily obtain such a design that the supply voltage P1 is cut off immediately after entry of a one-digit number, simply by adding a few flip-flop circuits. Further, not only a volatile circuit but also a non-volatile circuit may readily be used wherein, supply of the voltage P2 need not be continued but the voltage P2 may be switched on and off substantially in the same relationship with the ON-OFF state of the voltage P1. By doing so, the saving of battery power will be further greatly be enhanced and a single mercury battery will maintain its service life for more than several years. Furthermore, the present invention, as outlined previously, is applicable not only to small electronic computers but also to other electronic instruments having non-volatile display means, such as microreaders, and copying machines, etc. and thus, it is highly useful in industry.

We claim:

1. An electronic instrument having display means for displaying information entered therein, comprising:
   persistent display means;
   drive control circuit means for storing information and controlling the display of said persistent display means to enter said information therein;
   a single clear instruction generating means for generating a signal operative to clear both of said persistent display means and said drive control circuit means;
   first clearing means coupled to said clear instruction generating means and said display means and responsive to the signal from said single clear instruction generating means to clear information entered in said persistent display means; and
   second clearing means coupled to said clear instruction generating means and said drive control circuit means and responsive to the signal from said single clear instruction generating means to clear the information stored in said drive control circuit means.

2. An electronic instrument according to claim 1, wherein said clear instruction generating means includes manually operable switch means.

3. An electronic instrument according to claim 2, wherein said switch means comprises a power switch coupled to energize the instrument.

4. An electronic instrument according to claim 1, further comprising means for controlling said first and second clearing means to operate simultaneously to clear said display means and said drive control means.

5. An electronic instrument having display means for displaying information entered therein, comprising:
   persistent numerical display means;
   input means for applying numerical information and other signals to said electronic instrument;
   drive control circuit means for sequentially energizing the display of said persistent display means from left to right in accordance with the input sequence of the numerical information signals from said input means in which the numerical information is sequentially entered from the most significant digit toward least significant digit;
   power source means for supplying power to said persistent numerical display means;
   clear instruction signal generating circuit means for generating a clearing signal in response to operation of said input means;
   clearing circuit means responsive to the clear instruction signal from said clear instruction signal generating circuit means for clearing said persistent display means; and means for interrupting the supply of power from said power source means to said persistent numerical display means in response to operation of said input means.

6. An electronic instrument according to claim 5, wherein said power interrupting means includes detector means for detecting the operation of said input means, and switch means coupled to said detector means for interrupting the supply of power to said persistent display means under the control of an output from said detector means.

7. An electronic instrument having display means for displaying information entered therein, comprising:
persistent display means;
drive control circuit means for selectively energizing the display of said persistent display means;
power source means for energizing said control circuit means;
power switch means manually operable to connect said power source means to said control circuit means;
clear instruction signal generating circuit means included in said control circuit means for generating a clearing signal in response to operation of said power switch means; and
clearing circuit means responsive to the clear instruction signal from said clear instruction signal generating circuit means for clearing said persistent display means, wherein said clearing circuit means includes first and second control circuits operable upon closing of said power switch means for clearing respectively said display means and said drive control circuit means.

8. An electronic instrument having display means for displaying information entered therein comprising:
persistent display means;
drive control means for entering information in said persistent display means;
power supply means for supplying power to energize said display means and said control means;
means for disconnecting said power supply means from said display means while maintaining a supply of power to said control means when entry of information in said display means by said control means has been completed; and
means for re-connecting the power supply means to said display means prior to entry of subsequent information in said display means by said control means.

9. An electronic instrument according to claim 8, wherein said drive control means includes clear signal generating circuit means for clearing said display means in response to the reconnection of said power supply means to said display means.

10. An electronic instrument having display means for displaying information entered therein, comprising:
persistent display means;
drive control means for entering information in said persistent display means;
display completion signal generating circuit means for providing a signal when entry of information in said display means by said drive control means has been completed;
power supply means for supplying power to energize said display means; and
means coupled to said signal generating means and responsive to said completion signal for interrupting the supply of power from said power source means to said display means.

11. An electronic instrument according to claim 10, wherein said display completion signal generating circuit means includes a timer circuit for delaying the generation of the completion signal for a predetermined period after completion of entry of information in said display means.

12. An electronic instrument according to claim 10, wherein said display completion signal generating circuit means includes suppression circuit means for suppressing insignificant information to prevent its entry in said display means.

13. An electronic instrument according to claim 10, wherein said drive control means includes a digit pulse generator and said display completion signal generating circuit means includes a digit pulse detecting circuit means coupled to an output of said pulse generator.

14. An electronic instrument having display means for displaying information entered therein, comprising:
persistent numerical display means;
information input means including function keys and decimal number keys from 0 to 9;
control circuit means coupled to said input means for performing arithmetic operations and for controlling said persistent display means to display the result of said arithmetic operations;
means included in said control circuit means for clearing said persistent numerical display means;
power source means for supplying power to said display means; and
means included in said control circuit for interrupting the supply of power to said persistent numerical display means.

15. An electronic instrument according to claim 14, wherein said clearing means includes detector means for detecting the actuation of any of said number keys, and a clear executing circuit for executing the clearing action of said persistent numerical display means in response to an output signal from said detector means.

16. An electronic instrument according to claim 14, wherein said power supply interrupting means includes detector circuit means for detecting the actuation of any of said function keys, and switch means coupled to said detector circuit means for interrupting the supply of power to said persistent numerical display means under the control of a detection output from said detector circuit means.

17. An electronic instrument having display means for displaying information entered therein, comprising:
persistent numerical display means;
information input means including function keys and decimal number keys from 0 to 9;
control circuit means coupled to said input means for performing arithmetic operations and for controlling said persistent display means to display the result of said arithmetic operations;
means included in said control circuit means for clearing said persistent numerical display means, said clearing means including detector means for detecting the actuation of any of said number keys, and a clear executing circuit for executing the clearing action of said persistent numerical display means in response to an output signal from said detector means.

18. An electronic instrument having a display device for displaying information entered therein, comprising:
persistent numerical display means;

information input means including function keys and decimal number keys from 0 to 9;

control circuit means coupled to said input means for performing arithmetic operations and for controlling said persistent display means to display the result of said arithmetic operations;

power source means for supplying power to said display means;

means included in said control circuit for interrupting the supply of power to said persistent numerical display means.

19. An electronic instrument according to claim 18, wherein said power supply interrupting means includes detector means for detecting the actuation of any of said function keys, and switch means coupled to said detector means for interrupting the supply of power to said persistent numeric display means under the control of a detection output from said detector means.

20. An electronic instrument having display means for displaying information entered therein, comprising:

persistent display means;

drive control circuit means for selectively energizing the display of said persistent display means;

power source means for energizing said control circuit means;

power switch means manually operable to connect said power source means to said control circuit means;

clear instruction signal generating circuit means for generating a clearing signal in response to operation of said power switch means; and clearing circuit means responsive to the clear instruction signal from said clear instruction signal generating circuit means for clearing said persistent display means, said clearing circuit means includes a discharge circuit operable upon opening of said power switch means for clearing said display means.

* * * * *

UNITED STATES PATENT OFFICE
CERTIFICATE OF CORRECTION

Patent No. 4,099,247  Dated July 4, 1978

Inventor(s) HIROYUKI MIKADA, et al.

It is certified that error appears in the above-identified patent and that said Letters Patent are hereby corrected as shown below:

Column 10, line 20    Change "mans" to --means--.

Column 12, line 16    Change "predetermind" to --predetermined--.

Column 12, line 52    Change "whereuon" to --whereupon--.

Column 14, line 14    Change "($\omega$m)" to --($\Omega$m)--.

Column 14, line 14    Change "100$\omega$" to --100$\Omega$--.

Column 14, line 15    Change "meg$\omega$" to --meg$\Omega$--.

Signed and Sealed this

Twenty-sixth Day of December 1978

[SEAL]

Attest:

RUTH C. MASON
Attesting Officer

DONALD W. BANNER
Commissioner of Patents and Trademarks